United States Patent [19]
Willis

[11] 4,278,184
[45] Jul. 14, 1981

[54] ESCAPEMENT MECHANISM FOR AUTOMATIC FASTENER INSERT MECHANISMS

[76] Inventor: Clyde P. Willis, P.O. Box 335, Conover, N.C. 28613

[21] Appl. No.: 69,809

[22] Filed: Aug. 27, 1979

[51] Int. Cl.³ .............................................. B65H 5/22
[52] U.S. Cl. .................................... 221/233; 221/266; 221/278
[58] Field of Search ............... 221/233, 234, 263, 264, 221/266, 278; 227/112

[56] References Cited

U.S. PATENT DOCUMENTS

| | | | |
|---|---|---|---|
| 1,409,801 | 3/1922 | Twomley | 221/266 X |
| 3,095,999 | 7/1963 | Peterson | 221/233 |
| 3,554,403 | 1/1971 | Ginther | 221/278 X |
| 3,895,431 | 7/1975 | Froehlking | 221/278 X |
| 3,900,131 | 8/1975 | Ehrlich | 221/278 X |
| 3,906,615 | 9/1975 | Campbell et al. | 227/112 X |
| 3,946,926 | 3/1976 | Willis | 227/112 |

*Primary Examiner*—F. J. Bartuska
*Attorney, Agent, or Firm*—Charles R. Rhodes; Judith G. Smith

[57] ABSTRACT

A fluid operated reciprocal slide picks off fasteners, one at a time, from a delivery slide and delivers the fasteners to a flexible conduit. The same fluid that moves the aforementioned slide drives the fastener into the flexible conduit and on to an automatic fastener insert mechanism. The fluid drive is selectively activated by the trigger at the automatic fastener insert mechanism.

7 Claims, 7 Drawing Figures

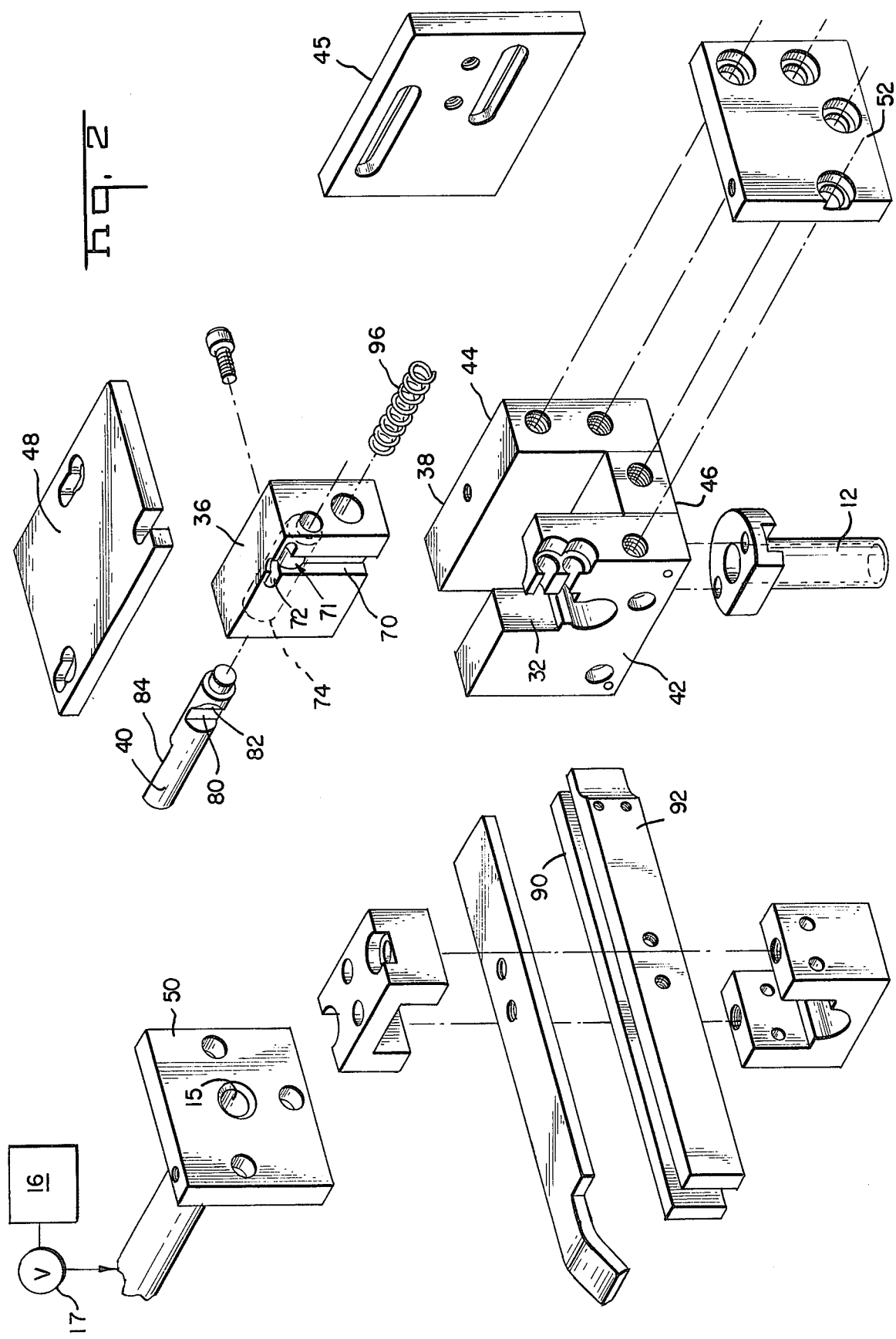

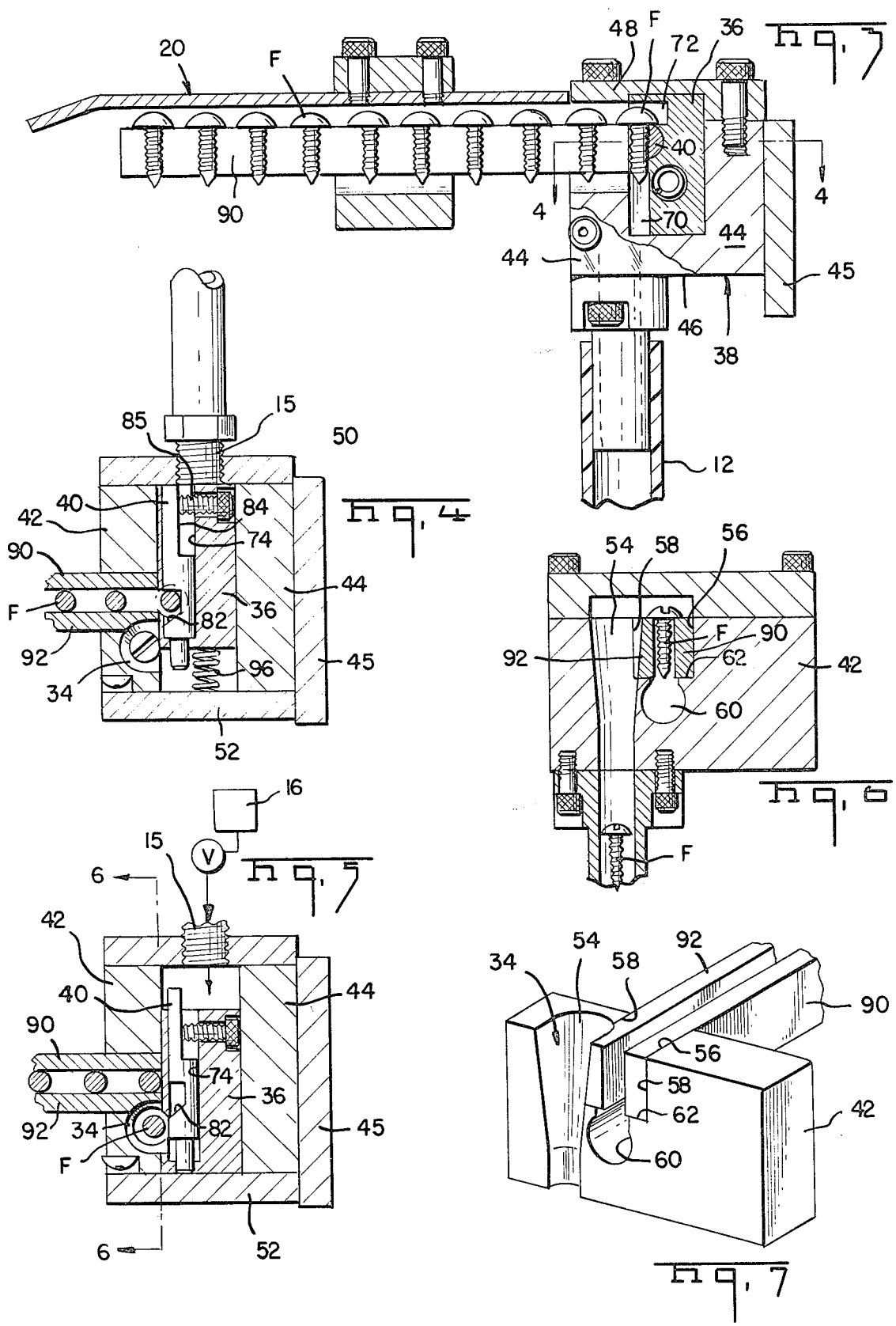

ESCAPEMENT MECHANISM FOR AUTOMATIC FASTENER INSERT MECHANISMS

BACKGROUND OF THE INVENTION

In the field of automatic fastener insert mechanisms it is generally necessary to provide some kind of escapement, transfer, or feed mechanism whereby fasteners may be picked off a track or line of fasteners being continuously supplied thereto and transferred, one at a time, to a flexible conduit through which they are delivered to the fastener inserting mechanism for emplacement into the work piece. One such mechanism is illustrated and described in U.S. Pat. No. 3,946,926, in which the escapement mechanism includes a slide which receives the fasteners and moves one fastener laterally to a position over the flexible conduit. The slide is operated by a solenoid. When the fastener is moved to the position over the flexible conduit it drops by a combination of gravity and vacuum from a fluid pressure source introduced downstream of the outlet, from whence the fasteners are directed to the emplacement mechanism. In a second embodiment similar to the first, the solenoid is replaced by an air cylinder in which the plunger thereof operates the slide but is basically the same as the solenoid operated slide approach.

In a third type of embodiment illustrated and described in U.S. Pat. No. 3,906,615, the slide may be operated by either the solenoid or plunger of the air cylinder described hereinabove. However, the air which conveys the fastener from the outlet of the escapement mechanism to the emplacement mechanism flows vertically from above the outlet if it is at the bottom, or below the outlet if it is at the top, through that portion of the escapement mechanism and pushes the fastener in the desired direction.

In either of the devices described hereinabove there are two activation systems necessary, one to move the slide from its receiving position to the delivery position and a second for actually moving the fastener through the flexible conduit. The second system is activated when the first has completed its operation. This leads to several disadvantages which have been noticed. First of all, there is extra, unnecessary equipment required for the two activating systems. With the additional equipment there is a greater chance of malfunction. Because of the two activating systems, the second system relies on the first activating system to get the fastener to the proper evacuation position and to get it there at the proper time. Timing of the second system with relation to the first then becomes very important.

SUMMARY OF THE PRESENT INVENTION

In general, the present invention is directed to a transfer or escapement mechanism in which the dual activating system and its disadvantages are eliminated. In this invention a single fluid pressure source (preferably compressed air) first drives the slide from its first to its second position, then flows through or around the slide to push the fastener on through the flexible conduit. Thus the same source of fluid pressure which delivers the fastener through the flexible conduit to the emplacement mechanism also drives the pick off carrier from its first to its second position.

More particularly, the aforementioned slide or carrier is enclosed within a housing that includes a fastener receiving inlet and a fastener delivery outlet to which is connected the flexible conduit. The slide includes a fastener seat that is first in communication with the fastener inlet of the housing, and is then moved to a position communicating with the outlet of the housing responsive to the application of fluid pressure. As the carrier moves from its first to the second position, the fastener is carried along a cam track at the end of which is positioned a cam member which urges the fastener out of its normal line of movement and into a delivery port in the front wall of the housing, from whence it is dropped into the conduit to the fastener inserting mechanism. The slide or carrier is normally spring biased rearwardly or toward the first position; however, upon activating of the fluid pressure device the fluid pressure overcomes the spring bias to drive the carrier to the second position. Upon release of the fluid pressure, the carrier is then urged backwardly to the first position by the spring pressure. The cover plate is hingedly attached to the housing so that if a jam should occur the cover plate may be easily lifted, whereupon access is provided to the interior of the housing for relieving the jam.

It is therefore an object of the present invention to provide an improved escapement or transfer mechanism for automatic fastener insert mechanisms.

It is another object of the present invention to provide an escapement mechanism of the type described which is more simple, economical, and maintenance free than those known heretofore.

It is yet another object of the present invention to provide an improved escapement mechanism of the type described in which fluid pressure from a single source is used to drive a carrier to pick off a single fastener from a delivery chute containing a plurality of fasteners and transfer the single fastener to an outlet in communication with the delivery conduit and urge the fastener through the conduit to fastener emplacement mechanism.

Other objects and a fuller understanding of the invention will become apparent through consideration of the following detailed description of a preferred embodiment in conjunction with the accompanying drawings in which:

FIG. 2 is an enlarged, exploded perspective view of the escapement mechanism according to the present invention;

FIG. 3 is a cross-sectional view taken substantially along lines 3—3 in FIG. 1;

FIGS. 4 and 5 are sectional views taken substantially along lines 4—4 in FIG. 3, illustrating the carrier in its first and second positions respectively;

FIG. 6 is a sectional view taken substantially along lines 6—6 in FIG. 5 and illustrating the front wall of the escapement housing; and FIG. 7 is a perspective view of the front wall of the escapement mechanism housing and the feed slide leading thereinto.

DETAILED DESCRIPTION OF A PREFERRED EMBODIMENT

Figure 1:
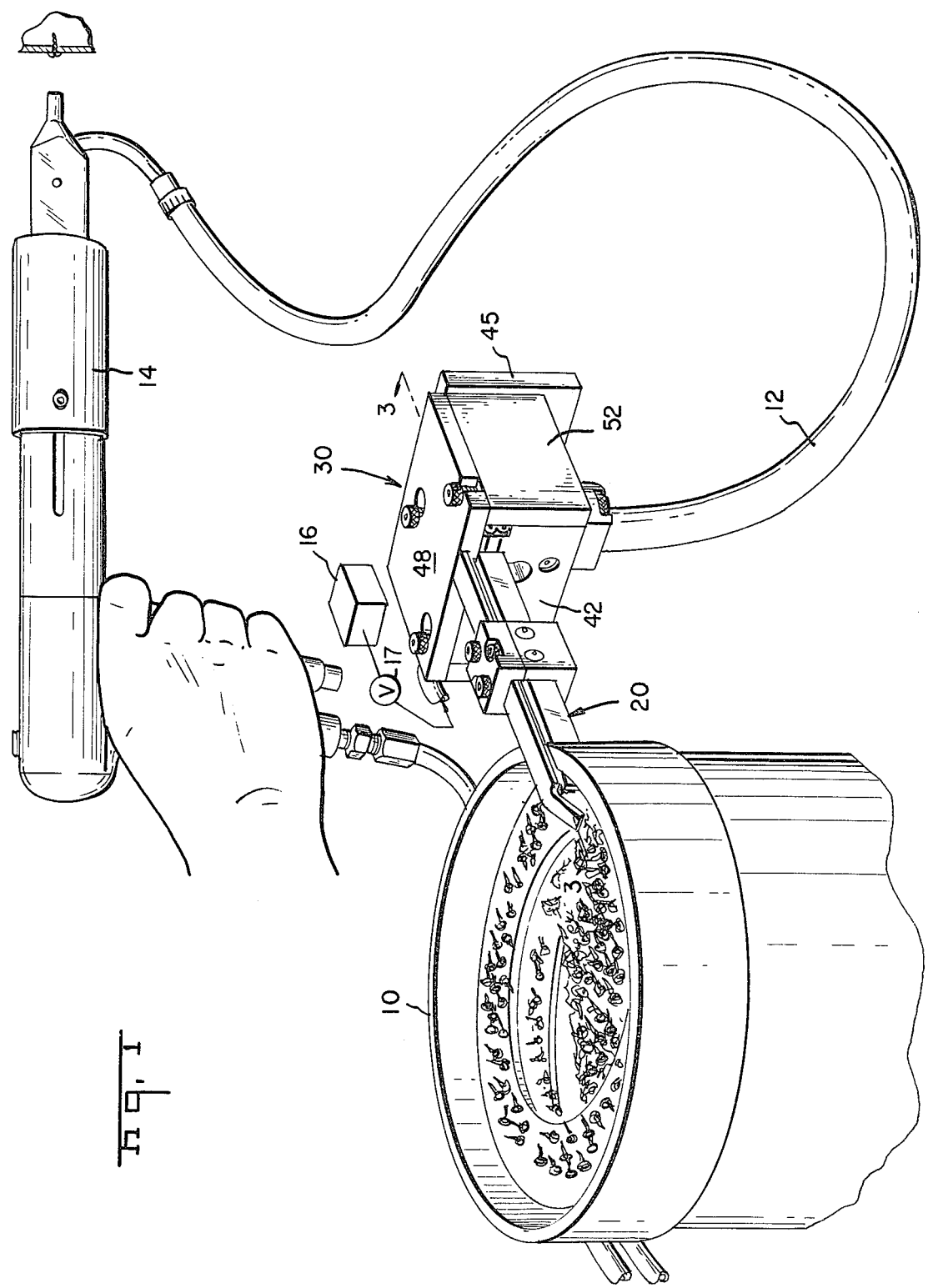
FIG. 1 is an environmental showing with the escapement mechanism in perspective, of a reservoir, chute, flexible conduit and fastener insert mechanism with which the escapement mechanism is designed for use.

Turning now to a description of a preferred embodiment with particular reference of FIG. 1 of the drawings, the escapement mechanism 30 of the present invention is adapted for use with a fastener insert mechanism of the type including a supply hopper 10 and a delivery means 20 which continuously removes fasteners F from the supply hopper 10 for delivery to the escapement mechanism 30. In the escapement mechanism a single fastener F is removed from the delivery chute 20 at inlet 32 and transferred to a second position aligned with outlet 34 which is in communication with a flexible conduit 12. The fasteners F are then delivered one at a time to a fastener insert mechanism 14. A fluid pressure source in the form of a source of compressed air 16 is provided and suitably connected to the air inlet 15 of the escapement mechanism 30 opposite the outlet 34 to flexible conduit 12.

The heart of the present invention lies in the construction of the escapement mechanism 30 and the manner in which it operates a slide means or carrier 36 to pick up fasteners one at a time from inlet 32, delivers them to outlet 34 and blow them on to the insert mechanism 14. Toward this end, air under pressure from source 16 enters the escapement mechanism 30 from one end 15 thereof, drives the slide 36 toward the other end, thereby moving it from its first to its second position. Simultaneously, as there is approximately 0.003 inch clearance between the carrier 36 and the walls of the housing which form the escapement mechanism 30, air passes around carrier 36 to deliver the fastener through the flexible conduit 12 all the way to the fastener insert mechanism 14.

Escapement mechanism 30 is formed of basically three subassemblies including a housing 38, the slide or carrier 36, and a cam member 40. Housing 38 includes a front wall 42, a rear wall 44, a bottom wall or spacer 46 which separates the front and rear walls, and a cover plate 48 attached to a pair of end plates 50,52. Front wall 42 and rear wall 44 are spaced apart by bottom wall 46 at such a distance as to form a trackway therebetween for receiving slide or carrier 36 therein in movable relation thereto. The housing 38 is provided with a base plate 45 for attachment of the escapement device to a panel or other mounting apparatus.

Looking at FIGS. 6 and 7 there is better illustrated the configuration of the inner surface of front wall or block 42 which is basically a rectangular member having a substantially funnel-shaped or vertical, tapered passageway 54 extending therethrough and forming outlet 34. The other distinguishing feature of the front plate or block 42 is the provision of a shouldered passageway 56 through the wall thereof which provides an access opening for the introduction of fasteners therethrough as will be described more fully hereinafter. Shoulder passageway 56 includes a relatively wide upper slot portion 58 and a narrower, lower slot portion 60 with a shoulder 62 connecting the two portions.

As previously mentioned, front wall 42, rear wall 44, and bottom wall or spacer 46 are secured together in conventional fashion, such as by screw fasteners or welding to form a slide block assembly for receipt of the slide block or carrier 36 therebetween. Housing 38 further includes a pair of end walls 50 and 52 which are secured to opposite ends of the aforementioned slide block assembly in a conventional manner. One of the end plates or walls 50 includes an opening 15 therein or therethrough for introduction of air under pressure to the chamber or trackway therein for reasons to be described hereinafter.

The slide block or carrier 36 is best illustrated in FIG. 2, and includes basically a rectangular, metallic block member or carrier, slightly shorter in length than the corresponding length of front wall 42 and rear wall 44. Along the front side of carrier 36 is a vertical slot 70 extending through the surface of the block 36 and partially through the thickness thereof for the receipt of the shank of the fasteners coming in through the housing 38 through the front wall opening 60. A cooperating, flared upper opening 72 similarly extends through the front surface of block 36 of the receipt of the head portion of the fasteners F received into housing 38 through the inlet 32. Together slot 70 and flared opening 72 form a retaining seat 71. Running horizontally through block 36 is a longitudinal slot 74 which is so shaped and sized as to receive the cam member 40, described more fully in detail hereafter and illustrated in FIG. 2. Slot 74 may extend through the surface of block 36, as illustrated, or it may be completely interiorly of the block without extending through the side surface, as long as it intersects the slot 70 as will be discussed. The cam 40 is slightly longer than the block 36, so that when positioned within the trackway or passageway in housing 38 the block 36 is free to reciprocate relative to a portion of the length of the cam.

Cam member 40 is an elongated member, preferably cut from round or rectangular bar stock and including a notch 80 therein. A cam surface 82 is provided at one end of notch 80 for reasons to be described hereinafter. Properly loosely positioned with the housing 38, the cam member 40 is held within slot 74, relatively stationary to the sliding movement or carrier 36 throughout at least a portion of the stroke of the carrier. The cam member 40 can be spaced from the surrounding wall of its passageway to permit further passage of air from inlet 15 to outlet 34. The end of cam 40 adjacent side wall 50 is provided with a flattened portion 84 which cooperates with a loosely positioned set screw 85 to prevent rotation of the cam. The other end of cam 40 includes an extension 86 of reduced diameter which protrudes through a cooperating opening 88 in slide block 36, also of reduced diameter. There is thus formed a shoulder 87 on cam 40 which is engaged on the return stroke of block to return the cam to its first position (FIG. 4). However, on the stroke of block 36 toward the second position, the end of extension 86 engages side plate 52 before the end of the stroke of block 36, thereby causing relative movement between cam 40 and block 36 which urges the fastener F into outlet 34.

A delivery chute 20 in the form of a pair of spaced, parallel rails 90,92 form a track between the reservoir 10 and the upper opening 58 in the front wall of housing 38. Screws or other fasteners form a column of fasteners which are presented continuously to the escapement mechanism where they are received one at a time within the openings 70,72 in slide block 36. Only one fastener F can be received within the slide block 36 at a time so that when the slide block is moved, that fastener is picked off from the continuous column of fasteners being delivered and moved to the second position. A spring 96 is provided intermediate the downstream end plate 52 and the corresponding end of slide block 36, and normally biases the slide block toward the left end of the trackway as illustrated in FIG. 4 at which point the air or fluid under pressure is introduced through the end plate 50 by means of a valve 17 in the pneumatic line between the source of compressed air 16 and the end wall 50, which is triggered by the triggering device of the fastener insert mechanism 14.

In operation, assuming that one fastener has just been inserted into a work piece, a new fastener inserted into the drive chamber (not shown) of the fastener insert mechanism 14, and slide block 36 is normally biased by spring 96 toward its first position (FIG. 4) with the seat 71 in slide block 36 formed by slot 70 and large slot 72 aligned with the inlet 32. All is now in readiness for the operation.

As the trigger on the fastener insert mechanism is pulled, valve 7 is open to allow air under pressure from source 16 to enter through side plate 50, driving the slide block 36 (carrying a fastener with it) to its second position in which the seat 71 in carrier 36 is now opposite the funnel-shaped passageway 54 (FIG. 5). When the carrier 36 reaches this second position the cam surface 82 on cam member 40 urges the fastener F by pressure against the shank out of the slide block 36 and into the funneled passageway 54. As the air pours through and around block 36, the fastener is then transferred directly to the fastener insert mechanism.

When the trigger is released the new fastener is in the chamber of the fastener insert mechanism 14, the slide block 36 is returned to its first position responsive to the closing of valve 17 and the action of spring 96, and a new fastener is now received in seat 71. The aforementioned sequence of operations can best be understood by a study of FIGS. 3–6 which tracks the route of the fastener through the escapement mechanism 30.

Although a preferred embodiment of the invention has been described hereinabove, it is apparent that various changes and modifications might be made to the embodiment described without departing from the scope of the invention which is set forth in the claims hereinbelow.

What is claimed is:

1. An improved escapement mechanism for automatic fastener devices of the type in which fasteners are removed from a reservoir and transferred by means of said escapement mechanism one at a time to a fastener inserting device, such as a tack gun, screw driver, riveter, and the like, said escapement mechanism comprising:
   (a) a housing having a fastener inlet aligned with a delivery device for said fasteners and a fastener outlet spaced therefrom and a trackway extending horizontally therethrough;
   (b) a reciprocating carrier positioned for reciprocal movement within said trackway and including a fastener retaining seat therein aligned when in a first receiving position with said fastener inlet and aligned when at a second dispensing position with said fastener outlet, said retaining seat being movable between said first and second positions responsive to the reciprocal movement of said carrier;
   (c) said carrier being normally biased toward said first position and movable toward said second position responsive to the application of an air flow from a source of compressed air against one end of said carrier to drive said carrier toward said second position; and
   (d) means for providing a pathway for said air flow from said source of compressed air through said trackway to said fastener outlet, whereby a portion of the air that moves said carrier from the first receiving position to the discharge position also bypasses said carrier in said trackway and discharges said fastener out of said outlet and on to said fastener driving device.

2. The improved escapement mechanism according to claim 1 wherein said housing includes a front wall and a rear wall spaced therefrom, said carrier being slightly less in length than the corresponding length of the space between said front and rear walls and slidably positioned therebetween for reciprocal movement parallel thereto, said inlet including a passageway through said front wall communicating with said retaining seat of said carrier when the first receiving position for delivery fasteners thereto, said outlet including a vertical passageway through said front wall aligned with said retaining seat when in the second dispensing position through which fasteners are discharged, and cam means for transferring fasteners from said retaining seat of said carrier into said vertical passageway as the carrier reaches said second discharge position.

3. The improved escapement mechanism according to claim 2 whereby said cam means for transferring fasteners from said retaining seat to said vertical passageway includes a cam member extending horizontally through said carrier in communication with said retaining seat, said cam member being greater in length than said carrier but less in length than the corresponding length of the space between the front and rear walls and including a transverse notch therein aligned with said retaining seat in said first position, said notch being misaligned with said retaining seat in said second position, said notch including a cam surface means at one end thereof for urging a fastener from said retaining seat into said discharge outlet responsive to relative movement between said carrier and said cam member.

4. An improved escapement mechanism according to claim 1 wherein said carrier is loosely received within said trackway such that the air pushes said carrier into movement from said first to said second position and passes around said carrier to deliver said fastener out of said outlet.

5. An improved escapement mechanism according to claim 4 wherein the width dimension of said carrier is substantially 0.003 inch smaller than the corresponding dimension of said trackway to permit passage of air therearound.

6. An improved escapement mechanism for automatic fastener inserting devices of the type in which fasteners are continuously removed from a reservoir and placed into a delivery chute, transferred by means of said escapement mechanism from said delivery chute, one at a time to an outlet conduit in said escapement mechanism, from whence the fasteners are delivered through a conduit to a fastener insert device, said escapement mechanism comprising:
   (a) a housing having a fastener inlet therein in communication with said delivery chute and a fastener outlet therein in communication with said conduit and a trackway extending horizontally therethrough;
   (b) reciprocal slide means movable in said trackway between said fastener inlet and fastener outlet for receiving fasteners one at a time from said inlet and delivering said fasteners to said outlet;
   (c) a source of fluid under pressure connected to said housing including and selectively activated at said fastener device;
   (d) said housing including an air inlet in communication with one end of said slide means and an air outlet, said air outlet being the same as said fastener outlet;
   (e) said reciprocal slide means being movable in said trackway between said fastener inlet and fastener outlet responsive to the activation of said fluid pressure source and simultaneously allowing passage of air through said trackway into said fastener outlet for providing the means of transporting fasteners to said automatic fastener inserting device.

7. In an escapement mechanism for automatic fastener devices of the type in which fasteners are removed from a reservoir and transferred one at a time to a fastener inserting device the improvement comprising:

(a) a carrier means positioned in a trackway for receiving fasteners one at a time from said reservoir when in a front position;

(b) said carrier means being moved to a second discharge position in said trackway by the application of air under pressure against the carrier means;

(c) a fastener outlet communicating with said carrier means at said second position to discharge fasteners from said carrier means into a conduit leading to said fastener inserting device; and (d) said carrier means including at least one air bypass passageway for permitting passage of a portion of said air within said trackway under pressure into said fastener outlet;

whereby the same air that drives the carrier means also transfers the fastener to the fastener insert device.

* * * * *